Dec. 31, 1957  D. L. JAFFE  2,818,553
VEHICLE GUIDING SYSTEM
Filed Aug. 25, 1953
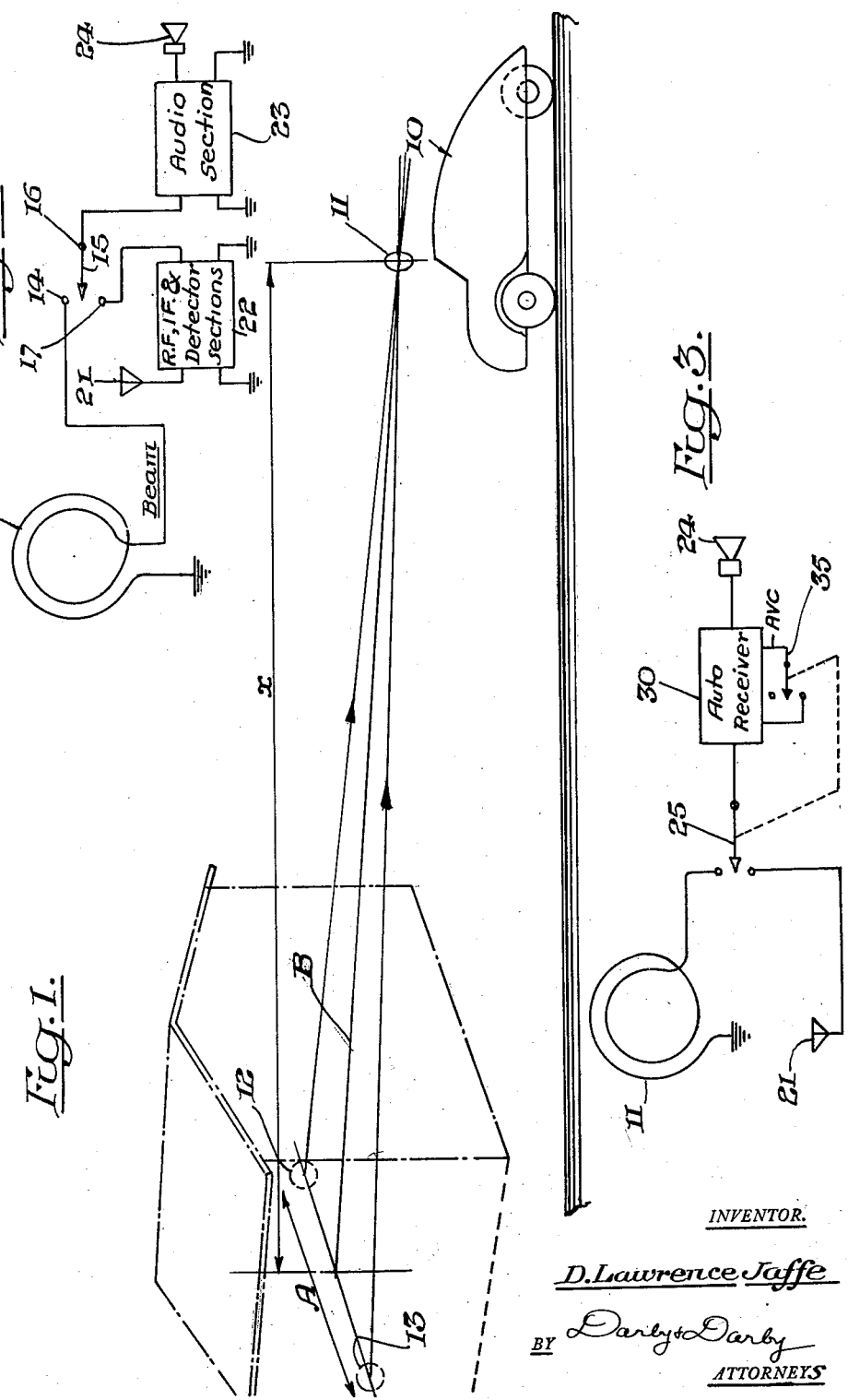
INVENTOR.
D. Lawrence Jaffe
BY Darby & Darby
ATTORNEYS

United States Patent Office 2,818,553
Patented Dec. 31, 1957

2,818,553

VEHICLE GUIDING SYSTEM

David Lawrence Jaffe, Great Neck, N. Y., assignor to Polarad Electronics Corporation, Brooklyn, N. Y., a corporation of New York Application August 25, 1953, Serial No. 376,502

8 Claims. (Cl. 340—52)

The present invention relates to a vehicle guiding system and particularly to a radio system for use in accurately guiding a vehicle such as an automobile into an enclosure such as a garage where visibility is limited or into a restricted space within which the vehicle is to be stored. It is particularly concerned with providing such systems as simple and inexpensive accessories to an existing vehicle radio receiver of the usual broadcast type.

In many situations, where space is restricted and where visibility may at times be poor, it is desirable to have an accurate indication of the proper position of a vehicle such as during parking. For example, in home garages, it is often desired to enter in a straight center line for proper clearance of the door frame and any objects which may be stored within the garage along the side walls thereof. Particularly in two or multiple car garages, it is desirable to be able to park a first car while being certain that later parked cars will have adequate space left for them. While this can be done by painted lines on the floor, the usual sight-lines of a vehicle prevent actual seeing of such lines within the short distances involved. Targets located on the end wall are also inadequate since they afford poor opportunity for lining up the vehicle axis properly, and often result in skewed parking.

Accordingly, a need exists for determining a line along which the vehicle is to be parked and for communicating to the driver accurate information as to the position of the vehicle axis relative to that line, at all times, during parking. This requires indicating apparatus operable over a short range, such as of the order of 50 feet or less, but with lateral accuracy of the order of a half-foot at the final position.

In the past, vehicle guidance systems have been known which determine a course and provide information as to deviation from that course. However, such systems are complicated and expensive, being suitable for guidance of aircraft or the like over distances of several miles, and are not simple, economical and accurate at small ranges, such as is required for the above and similar purposes.

According to the present invention, a simple accessory system is provided for vehicles, cooperating with the conventional vehicle broadcast or other radio receiver, to provide such guiding information with proper accuracy and at a minimum of cost of equipment and installation.

This is done, according to a preferred form of the present invention, by using the transformer field of alternating currents by simple apparatus installed on the garage wall and on the vehicle, to yield an accurate indication of deviation from proper course.

It is an object of the invention to provide a means for guiding the operator of a motor vehicle in operating that vehicle into an enclosure wherein visibility is limited or the space is restricted or both, with a high degree of accuracy.

It is another object of the invention to provide a system of the type described which may likewise be utilized for guiding one vehicle in following the path of a preceding vehicle in a convoy or the like.

Other objects and features of the invention will be apparent when the following description is considered in connection with the annexed drawings, in which, Figure 1 is a schematic elevational view showing a vehicle entering a garage and likewise illustrating the path of signals emanating within the garage and transmitted to the vehicle which signals serve to guide the operator in maneuvering the vehicle into the garage;

Figure 2 is a schematic diagram showing one form of connection of a loop antenna mounted on the vehicle to the normal vehicle radio; and Figure 3 is a schematic diagram showing another form of connection of loop antenna to vehicle radio.

Referring now to the drawings, the vehicle 10 is provided with a loop antenna 11 which antenna is located in the longitudinal center line of the vehicle preferably toward the front thereof, as for example, either on the roof or the hood, and in a plane transverse to the longitudinal axis of the vehicle.

Located within the garage are two transmitting antennas 12 and 13, these antennas being fixed on the wall or other convenient place and being equidistant from the ground or garage floor and separated by a distance A. These antennas 12 and 13 are preferably loop antennas and are placed in a plane transverse to the axis B along which it is desired to position the vehicle. The ampere turns of the antenna 12 are arranged so that they are 180° out of phase with those of the antenna 13. It will be seen, therefore, that if an audio frequency excites simultaneously antennas 12 and 13, along a line B perpendicular to the plane of the loops and equidistant therebetween, the transformer fields originating in the two loop antennas 12 and 13 will cancel. On either side of the line B a resultant audio signal will be produced having an amplitude corresponding to the amount of deviation from line B. This signal is utilized at the vehicle to obtain an indication of the deviation from the desired course B, to permit the driver to correct his position.

As shown in Figure 2, the normal vehicle radio comprises its antenna 21, and the receiver proper, shown in two sections 22 and 23, the former including all radio frequency, converter, intermediate frequency and detector stages, while the latter includes the audio frequency stages, to whose output is connected the usual sound reproducer 24.

As is indicated in Figure 2, the loop antenna 11 is connected to one contact terminal 14 of a single pole double throw switch 15, whose movable member is connected to the input of the audio portion 23 of the radio receiver and whose other fixed terminal 17 is connected to the output of the preceding stages 22 of the receiver.

In this form of the invention, when switch arm 15 is connected to control 17, the vehicle receiver is adapted for normal use, relying upon antenna 21. When connected to contact 14, the loop antenna 11 feeds its output directly to the audio stages 23 to be reproduced by 24.

The transmitter loops 12, 13 in this case are excited by audio frequency currents, such as 60 to 100 cycles, and in a phase relation to produce oppositely phased induction fields along their perpendicular bisector B. Thus, the receiver output will be zero when the vehicle loop 11 is on course B, and will increase in amplitude as the loop deviates from that course.

As a modification of the system, radio frequency currents may be fed to the two transmitter loops 12 and 13, these currents being of the same frequency and being audio modulated with modulations which are 180° out of phase. In this case the receiver would have the circuit of Figure 3, in which the switch 25 selectively connects loop 11 or antenna 21 to the receiver 30. Preferably the receiver automatic volume control is interrupted also by ganged switch 35 since such a control would tend to reduce the null sensitivity of the system.

In either of the above forms of the invention, loop 11 may be used as the usual receiver antenna, rather than using a separate antenna 21, by suitable switching arrangements by which loop 11 is coupled selectively to the receiver input for normal reception or to the audio section as in Figure 2. In such case switch 25 of Figure 3 could be omitted.

In some cases, in the Figure 2 form, the loop 11 could be left permanently coupled to both the audio input and detector output, omitting switch 15.

As will be obvious, a system such as described above may be used to guide vehicles of a convoy. In this event antennas such as 12 and 13 would be attached to the rear of the lead vehicle of a convoy and antennas such as 11 would be attached to the following vehicles and the distance between vehicles could then be determined by measuring the field intensity of the signal received by the following vehicles which field intensity is a function of distance. In other words, the following vehicles could maintain their spacing in the convoy by maintaining a predetermined field intensity of received signal. Likewise, a system of the class described might be utilized to guide a blind person along a predetermined path it being only necessary that that person be supplied with a battery operated receiving device such a small portable radio receiver.

While the present invention has been described in the above embodiments as using loop antennas with the induction or transformer field, exactly the same principle can be applied to "whip" or linear antennas utilizing the electric field of the alternating current. For this purpose, the transmitting antennas are of the linear type, preferably vertical, and the receiving antenna 11 is also linear. In the case of Fig. 3, antenna 11 may be omitted and antenna 21 fixedly connected in circuit whereby it serves both for ordinary radio broadcast reception and for guidance. In Fig. 2, antenna 21 may be used selectively for both these purposes, merely switching between the input to circuit 22 and terminal 16, as desired.

While I have described preferred embodiments of the invention, it will be understood that I wish to be limited not by the foregoing description, but solely by the claims granted to me.

What is claimed is:

1. A vehicle guiding system comprising, in combination, a pair of transmitting loops, said loops being located in a plane perpendicular to a line to be followed by a vehicle and equally distant and on opposite sides of said line, means to excite said loops with identical signals, said loops producing induction fields 180° out of phase, and means for picking up and amplifying said fields at a vehicle, said fields cancelling when the vehicle is located on the line to be followed and their resultant increasing in magnitude when said vehicle deviates from said line.

2. A device as claimed in claim 1, characterized in that said transmitted signals are supplied from a single source and said transmitting loops are oppositely wound to thereby dephase the signals transmitted thereby.

3. A device as claimed in claim 1, characterized in that said transmitted signals are of audio frequency, and further characterized in that said receiving means is a loop and said amplifier is the audio section of the usual automotive radio.

4. A device as claimed in claim 1, characterized in that the said identical signals are audio-frequency-modulated radio frequency, said transmitting antennas transmit said signal in opposite phase and said amplifying means includes a radio frequency receiver.

5. A device as claimed in claim 3, wherein said transmitting loops are oppositely wound and are supplied with signals from a single audio frequency signal generator.

6. A device as claimed in claim 4, characterized in that said transmitting loops are oppositely wound and further characterized in that signals are supplied to said loops by a single audio-frequency-modulated radio frequency signal source.

7. A vehicle guiding system comprising, in combination, a pair of transmitting antennas in a plane perpendicular to a line to be followed by a vehicle and equally distant from and on opposite sides of said line, means to excite said antennas with identical signals, said antennas producing respective fields 180° out of phase, and means for detecting and indicating the resultant of said fields at a vehicle, said fields cancelling when the vehicle is on said line and their resultant increasing in magnitude when said vehicle deviates from said line.

8. A system as in claim 7 wherein said antennas are vertical linear antennas.

References Cited in the file of this patent

UNITED STATES PATENTS

| | | |
|---|---|---|
| 1,446,385 | Hansen | Feb. 20, 1923 |
| 1,884,707 | Hyland | Oct. 25, 1932 |
| 2,038,539 | Carter | Apr. 28, 1936 |
| 2,038,873 | Purington | Apr. 28, 1936 |
| 2,196,139 | Carlson | Apr. 2, 1940 |
| 2,449,532 | Leydorf | Sept. 14, 1948 |